UNITED STATES PATENT OFFICE.

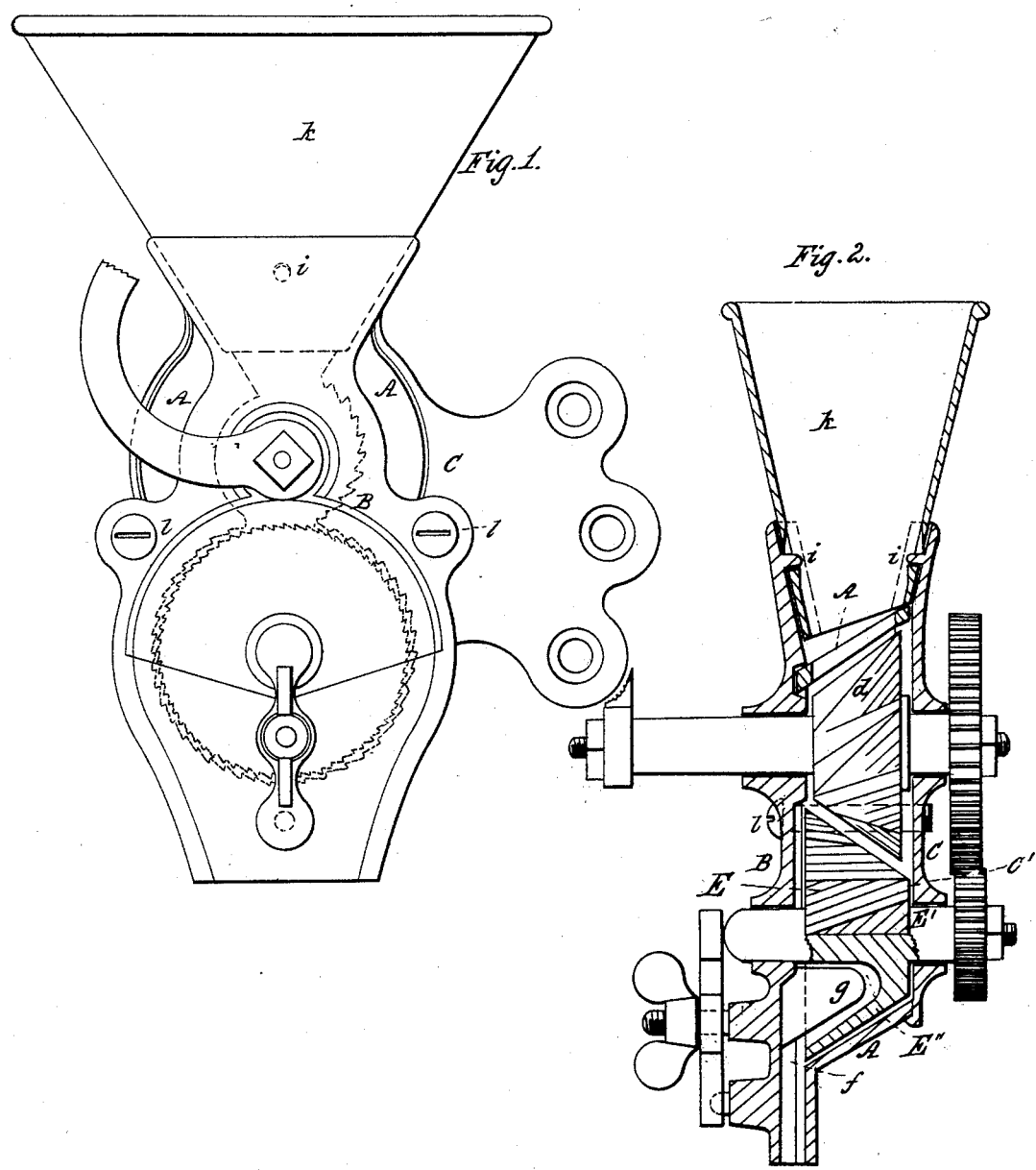

JOHN PARKER AND EDMUND PARKER, OF MERIDEN, CONNECTICUT.

COFFEE-MILL.

Specification of Letters Patent No. 27,065, dated February 7, 1860.

*To all whom it may concern:*

Be it known that we, JOHN PARKER and EDMUND PARKER, of Meriden, in the county of New Haven and State of Connecticut, have invented certain new and useful Improvements in Coffee-Mills; and I do hereby declare that the following is a full, clear, and exact description of the same, reference being made to the annexed drawing, making a part of this specification, in which—

Figure I is a front view or elevation. Fig. II is a transverse vertical central section.

Similar letters indicate similar parts throughout the figures.

Our improvements have for their object the simplifying of the construction, as well as increasing the efficacy and usefulness of the coffee mill for domestic purposes.

As is well known, these implements are almost always to be used by persons of but little discretion, as servants, and therefore should be so constructed as to avoid the possibility of being injured by careless handling or adjusting, while, as they are required so generally as a household implement any improvement which reduces the cost of construction becomes of considerable importance.

In the coffee and spice mills as ordinarily made, the adjustment of the degree of fineness to which the grinding shall be carried is made by moving the grinding cone in the direction of its axis, whereby it is brought more or less near to the surface against which it is to act. If these two surfaces are permitted to come into actual contact their sharpness will be at once destroyed, and hence, in view of the class of persons who use them, they have usually been protected against this by having a portion of the cone at its base left plain, and a portion of the other surface also plain, these two smooth parts coming into contact, as the cone is set up, before the ridged portions can touch. This involves the loss of a portion of the grinding surfaces and is therefore objectionable. Our manner of guarding against this contact is to make the smaller end of the cone, a bearing, against the back plate of the mill, taking care to so adjust its length that the end of the cone, and the plate, shall come into contact before the grinding surfaces can quite touch, and thus we are enabled to cut the whole of the sides of the cone and of its concave into grinding parts.

In the ordinary mills the ground coffee works into the hollow of the cone and also fills the space between that and the front plate, thereby not only preventing the delivery of the finely ground portions over the edge of the cone, but also permanently clogging that space so that the mill cannot be adjusted to grind coarser. This difficulty we obviate by casting upon the front plate a piece which shall extend into the hollow of the cone at the lower side, and enlarging the delivery space in the direction of its width, whereby, by the rotation of the cone, all that would otherwise gather is constantly removed. Another improvement lies in the manner of affixing the hopper to the grinding parts whereby simplicity and cheapness of construction are attained.

In the drawings annexed a coffee mill is represented of the kind which has a breaker as well as a grinding cone. The case or shell consists of three parts; a curved piece A, made to inclose the sides of both the breaker and the grinding cone, the interior of which affords the surfaces for those to act against; a front plate B, and a back plate C. The breaker is seen at ($d$) and the grinding cone at ($e$), each mounted in the usual manner upon shafts which pass through the plates, and are geared together at the back so that the motion of the one is transmitted to the other in reverse direction as required. The cone is shown as set nearly up to the back plate C and it is to be made of such length that its smaller end ($e'$) will come into contact with that plate at the line C' just before the projections on its sides at ($e''$) would touch those on the interior of A. It is hollowed out from the larger end, as shown at the part exhibited as in section, and the external surface is cut into grooves or "dressed" throughout its entire width, as shown. The interior surface of A, where it incloses this cone is cut in like manner.

The delivery of the ground coffee is facilitated by having the passage behind the cone ($e$) enlarged below the shaft, and for that purpose a depression is made in the front plate, as at ($f$), which extends quite across the mill. A piece of metal, cast solid with the front plate, projects out into the hollow in the cone, having generally the form in profile of the section of the interior of the cone, but so as to leave room for setting the cone to the position required for grinding coarsest. This piece is shown at (*g*) and its operation is that of a scraper to prevent the ground coffee from clogging the large part of the cone. The upper ends of the front and back plates are curved outward, as shown in Fig. II to a form suitable to receive between them the hopper (*k*). This hopper is of the usual shape, cast in one piece and the front and back plates are carried around the sides, as shown in dotted lines, whereby it is held in proper position. The upper part of the curved side piece A incloses the bottom of the hopper, and it is secured in place by having a pin (*i*), which is cast upon each of the plates, enter a hole cast also in the hopper to receive those pins. Thus no screw or rivet is necessary for affixing the hopper, the mill being all held together by the two screws (*l*) which connect the two plates.

1. We claim the manner herein described of preventing the grinding surfaces from coming into contact, that is to say, by so constructing the grinding cone that its smaller end shall come to a bearing against the plate C' in the manner and for the purposes set forth.

2. We also claim the projecting piece (*g*) in combination with the enlarged portion of the delivery aperture, for the purpose set forth.

3. We also claim the manner of affixing the hopper, specifically as described.

In testimony whereof we have hereunto subscribed our names.

JOHN PARKER.
EDMUND PARKER.

Witnesses:
ALMERON MILES,
JOHN W. MILES.